(12) United States Patent
Biesemans et al.

(10) Patent No.: US 9,726,487 B2
(45) Date of Patent: Aug. 8, 2017

(54) GEOMETRIC REFERENCING OF MULTI-SPECTRAL DATA

(75) Inventors: Jan Biesemans, Gent (BE); Bavo DeLaure, Heverlee (BE); Bart Michiels, Turnhout (BE)

(73) Assignee: VITO NV, Mol (DE)

( * ) Notice: Subject to any disclaimer, the term of this patent is extended or adjusted under 35 U.S.C. 154(b) by 453 days.

(21) Appl. No.: 13/515,331

(22) PCT Filed: Dec. 17, 2010

(86) PCT No.: PCT/EP2010/070158
§ 371 (c)(1),
(2), (4) Date: Jun. 12, 2012

(87) PCT Pub. No.: WO2011/073430
PCT Pub. Date: Jun. 23, 2011

(65) Prior Publication Data
US 2012/0257047 A1    Oct. 11, 2012

(30) Foreign Application Priority Data
Dec. 18, 2009  (EP) .................... 09180052

(51) Int. Cl.
*G06K 9/46* (2006.01)
*H04N 7/18* (2006.01)
*G01C 11/02* (2006.01)
*G06K 9/00* (2006.01)

(52) U.S. Cl.
CPC .......... *G01C 11/025* (2013.01); *G06K 9/0063* (2013.01)

(58) Field of Classification Search
CPC .................................... G01C 11/025

USPC ........................................... 348/135
See application file for complete search history.

(56) References Cited

U.S. PATENT DOCUMENTS

| 4,822,998 A | 4/1989 | Yokota et al. |
| 4,951,136 A | 8/1990 | Drescher et al. |
| 5,777,329 A * | 7/1998 | Westphal ................. G01J 5/20 250/339.02 |

(Continued)

FOREIGN PATENT DOCUMENTS

| JP | 63-042429 A | 2/1988 |
| JP | 2003-219252 A | 7/2003 |

(Continued)

OTHER PUBLICATIONS

Machine level english translation of JP 2003219252 A.*
(Continued)

*Primary Examiner* — Mohammad J Rahman
(74) *Attorney, Agent, or Firm* — Bacon & Thomas, PLLC (57) ABSTRACT

A sensing device for obtaining geometric referenced multi-spectral image data of a region of interest in relative movement with respect to the sensing device, includes a first two dimensional sensor element and a spectral filter. The sensing device obtains subsequent multi-spectral images during the relative motion of the region of interest with respect to the sensing device, thus providing spectrally distinct information for different parts of a region of interest using different parts of the first sensor. A second two dimensional sensor element, using the second sensor element, provides an image of the region of interest for generating geometric referencing information to be coupled to the distinct spectral information.

14 Claims, 5 Drawing Sheets

(56) References Cited

U.S. PATENT DOCUMENTS

| | | | | |
|---|---|---|---|---|
| 5,956,434 | A * | 9/1999 | Shibata | G06G 7/26 348/154 |
| 6,341,016 | B1 * | 1/2002 | Malione | G01B 11/2509 345/419 |
| 6,549,548 | B2 * | 4/2003 | Kuznetsov | G01J 9/0246 372/32 |
| 6,657,194 | B2 * | 12/2003 | Ashokan | H01L 27/14609 250/338.4 |
| 7,095,026 | B2 * | 8/2006 | Devitt | G01J 1/04 250/338.1 |
| 7,135,698 | B2 * | 11/2006 | Mitra | H01L 27/14649 250/338.1 |
| 7,202,955 | B2 * | 4/2007 | Te Kolste | G01J 3/18 356/454 |
| 7,330,266 | B2 * | 2/2008 | Guerineau | G01J 3/0259 356/454 |
| 7,351,977 | B2 * | 4/2008 | Devitt | G01J 3/0259 250/353 |
| 8,546,853 | B2 * | 10/2013 | Tian et al. | 257/226 |
| 8,629,986 | B2 * | 1/2014 | Hillmer | B82Y 10/00 356/519 |
| 8,821,799 | B2 * | 9/2014 | Bassler | G01N 15/147 422/105 |
| 9,164,037 | B2 * | 10/2015 | Bassler | G01N 21/6408 |
| 2003/0193589 | A1 | 10/2003 | Lareau et al. | |
| 2005/0134712 | A1 * | 6/2005 | Gruhlke | G02B 5/201 348/272 |
| 2006/0045316 | A1 * | 3/2006 | Hauke | G06K 9/00033 382/116 |
| 2006/0054782 | A1 * | 3/2006 | Olsen | G02B 3/0062 250/208.1 |
| 2007/0016079 | A1 * | 1/2007 | Freeman | A61B 5/0059 600/476 |
| 2007/0232930 | A1 * | 10/2007 | Freeman | A61B 5/0059 600/476 |
| 2007/0249913 | A1 * | 10/2007 | Freeman | A61B 5/0059 600/300 |
| 2007/0252134 | A1 * | 11/2007 | Krishna et al. | 257/21 |
| 2008/0029714 | A1 * | 2/2008 | Olsen et al. | 250/475.2 |
| 2011/0043823 | A1 * | 2/2011 | Hillmer | B82Y 10/00 356/519 |
| 2011/0108708 | A1 * | 5/2011 | Olsen et al. | 250/208.1 |
| 2011/0309236 | A1 * | 12/2011 | Tian | H01L 27/14603 250/208.1 |
| 2012/0327248 | A1 * | 12/2012 | Tack et al. | 348/164 |
| 2015/0009353 | A1 * | 1/2015 | Venkataraman | H01L 27/14618 348/218.1 |

FOREIGN PATENT DOCUMENTS

| | | |
|---|---|---|
| JP | 2008-191097 A | 8/2008 |
| JP | 5715643 B2 | 5/2015 |
| WO | 96/30854 A | 10/1996 |
| WO | 2011/073430 A1 | 6/2011 |

OTHER PUBLICATIONS

Machine level english translation of JP 2008191097 A.*
Japanese Office Action dated Aug. 12, 2014 for JP 2012-543803, and English translation thereof.
Hiroshi Otake, Present Conditions and Prospects of High-Definition Image Sensor, Image Laboratory, Japan, Japan Industrial Publishing Co., Ltd., vol. 13, No. 8, pp. 24-29, Aug. 1, 2002.
Hiromitsu Shiroki, Resent Topics of Image Sensors, Applied Physics, Syun Washio, The Japan Society of Applied Physics, vol. 54, pp. 32-39, Apr. 10, 1985.
Japanese Office Action dated Feb. 25, 2014 for JP 2012-543803, and English translation thereof.
International Search Report for PCT/EP2010/070158, Apr. 1, 2011.
International Preliminary Report on Patentability for PCT/EP2010/070158, Nov. 24, 2011.
Japanese Office Action dated Sep. 29, 2015 for JP 2014-251092, and English translation thereof.
Second Canadian Office Action dated Apr. 1, 2015 for CA 2,784,258.
Japanese Office Action dated Apr. 26, 2016 for JP 2014-251092, and English translation thereof.

* cited by examiner

| | | | | | |
|---|---|---|---|---|---|
| (x1,y1,λ1) | (x1,y2,λ1) | (x1,y3,λ1) | .... | .... | (x1,yn,λ1) |
| (x2,y1,λ2) | (x2,y2,λ2) | (x2,y3,λ2) | .... | .... | (x2,yn,λ2) |
| (x3,y1,λ3) | (x3,y2,λ3) | (x3,y3,λ3) | .... | .... | (x3,yn,λ3) |
| .... | .... | .... | .... | .... | .... |
| .... | .... | .... | .... | .... | .... |
| .... | .... | .... | .... | .... | .... |
| (xm,y1,λm) | (xm,y2,λm) | (xm,y3,λm) | .... | .... | (xm,yn,λm) |

$HI_1$

| | | | | | |
|---|---|---|---|---|---|
| (x0,y1,λ1) | (x0,y2,λ1) | (x0,y3,λ1) | .... | .... | (x0,yn,λm) |
| (x1,y1,λ2) | (x1,y2,λ2) | (x1,y3,λ2) | .... | .... | (x1,yn,λm) |
| (x2,y1,λ3) | (x2,y2,λ3) | (x2,y3,λ3) | .... | .... | (x2,yn,λm) |
| .... | .... | .... | .... | .... | .... |
| .... | .... | .... | .... | .... | .... |
| .... | .... | .... | .... | .... | .... |
| (xm-1,y1,λm) | (xm-1,y2,λm) | (xm-1,y3,λm) | .... | .... | (xm-1,yn,λm) |

$HI_2$

| | | | | | |
|---|---|---|---|---|---|
| (x0-1,y1,λ1) | (x0-1,y2,λ1) | (x0-1,y3,λ1) | .... | .... | (x0-1,yn,λm) |
| (x0,y1,λ2) | (x0,y2,λ2) | (x0,y3,λ2) | .... | .... | (x0,yn,λm) |
| (x1,y1,λ3) | (x1,y2,λ3) | (x1,y3,λ3) | .... | .... | (x1,yn,λm) |
| .... | .... | .... | .... | .... | .... |
| .... | .... | .... | .... | .... | .... |
| .... | .... | .... | .... | .... | .... |
| (xm-2,y1,λm) | (xm-2,y2,λm) | (xm-2,y3,λm) | .... | .... | (xm-2,yn,λm) |

$HI_3$

.....

| | | | | | |
|---|---|---|---|---|---|
| (x1-m,y1,λ1) | (x1-m,y2,λ1) | (x1-m,y3,λ1) | .... | .... | (x1-m,yn,λm) |
| (x2-m,y1,λ2) | (x2-m,y2,λ2) | (x2-m,y3,λ2) | .... | .... | (x2-m,yn,λm) |
| (x3-m,y1,λ3) | (x3-m,y2,λ3) | (x3-m,y3,λ3) | .... | .... | (x3-m,yn,λm) |
| .... | .... | .... | .... | .... | .... |
| .... | .... | .... | .... | .... | .... |
| .... | .... | .... | .... | .... | .... |
| (x1,y1,λm) | (x1,y2,λm) | (x1,y3,λm) | .... | .... | (x1,yn,λm) |

# GEOMETRIC REFERENCING OF MULTI-SPECTRAL DATA

FIELD OF THE INVENTION

The invention relates to the field of image capturing e.g. in aerial or industrial imaging. More particularly, the present invention relates to sensing systems for obtaining multi-spectral images, corresponding imaging systems and methods for using them.

BACKGROUND OF THE INVENTION

Hyperspectral imaging is a form of spectral imaging wherein information from across the electromagnetic spectrum is collected in many narrow spectral bands and processed. From the different spectral images that are collected, information of the objects that are imaged can be derived. For example, as certain objects leave unique spectral signatures in images which may even depend on the status of the object, information obtained by multi-spectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information.

Whereas originally hyperspectral remote sensing was mainly used for mining and geology, other applications such as ecology, agriculture and surveillance also make use of the imaging technique.

Some agricultural and ecological applications are known wherein hyperspectral remote sensing is used, e.g. for monitoring the development and health of crops, grape variety detection, monitoring individual forest canopies, detection of the chemical composition of plants as well as early detection of disease outbreaks, monitoring of impact of pollution and other environmental factors, etc. are some of the agricultural applications of interest. Hyperspectral imaging also is used for studies of inland and coastal waters for detecting biophysical properties. In mineralogy, detection of valuable minerals such as gold or diamonds can be performed using hyperspectral sensing, but also detection of oil and gas leakage from pipelines and natural wells are envisaged. Detection of soil composition on earth or even at other planets, asteroids or comets also are possible applications of hyperspectral imaging. In surveillance, hyperspectral imaging can for example be performed for detection of living creatures.

In some applications, multi-spectral data can be obtained by collecting a full two dimensional image of a region in one spectral range of interest and by subsequently collecting other full two dimensional images of that region in other spectral ranges of interest whereby spectral filters are switched in between. This way of data collection nevertheless is not always possible, especially when the region of interest and the imaging system undergo a large relative movement with respect to each other.

In view of the relative movement, accurate determination of positional information is important for a correct interpretation of the collected different spectral data. Known systems make use of a global positioning system (GPS) and/or an inertial measurement unit (IMU).

SUMMARY OF THE INVENTION

It is an object of embodiments of the present invention to provide good sensing systems for obtaining multi-spectral images of regions of interest providing distinct information regarding the region of interest for different wavelengths or wavelength regions and good methods for obtaining such spectral images of regions of interest.

It is an advantage of embodiments according to the present invention that accurate geometric information, e.g. positional information, can be coupled to multi-spectral, e.g. advantageously to hyper-spectral information. It is an advantage of some embodiments of the present invention that multi-spectral information can be obtained with a good, e.g. high, positional accuracy. It is an advantage of embodiments of the present invention that multi-spectral information can be obtained with additional geometric information of the objects in the region of interest, such as for example their relative height.

It is an advantage of embodiments according to the present invention that, e.g. due to integration of the two sensors on the same chip, a compact sensing system can be obtained. It is an advantage of embodiments according to the present invention that integration on the same chip provides a fixed alignment, resulting in accurate geometric information to be combined with the spectral data. It is an advantage of embodiments according to the present invention that a light weight sensing system is obtained, that can easily be integrated in an unmanned Aerial vehicle (UAV).

It is an advantage of embodiments according to the present invention that a sensing system with large width can be obtained, so that for some applications a broad area can be imaged.

It is an advantage of embodiments according to the present invention that multi-spectral sensing systems are obtained that combine a compactness and/or low weight with accurate data collection.

It is an advantage of embodiments according to the present invention that less alignment is required for setting up an imaging system, as part of the alignment is performed during processing of the multi-spectral sensor and the geometric referencing sensor, e.g. the sensor providing geometric information regarding the objects.

The above objective is accomplished by a method and device according to the present invention.

The present invention relates to a sensing device for obtaining geometric referenced multi-spectral image data of a region of interest in relative movement with respect to the sensing device, the sensing device comprising at least a first two dimensional sensor element, a spectral filter and a second two dimensional sensor element, the sensing device being adapted for obtaining subsequent multi-spectral images during said relative motion of the region of interest with respect to the sensing device thus providing distinct spectral information for different parts of a region of interest using the first sensor element, whereby the spectral filter and the first sensor element are arranged for obtaining spectral information at a first wavelength or wavelength range using a part of the first sensor element and for obtaining spectral information at a second wavelength or wavelength range using another part of the first sensor element. The sensing device is adapted for providing, using the second sensor element, an image for generating geometric reference information, to be coupled to the spectral information. The first and second sensor element furthermore are integrated on the same substrate.

It is an advantage of embodiments according to the present invention that the sensing device is less subject to inaccuracies due to thermal load on the sensing device or due to influence of environmental conditions, especially compared to sensing devices having a heterogeneous mechanical interface holding two independent sensors together. The first sensor element may be provided with a spectral filter for obtaining distinct spectral information on at least two different lines or columns or blocks of the first sensor element. The spectral filter may be a step-filter comprising a plurality of spectral bands allowing spectrally dependent filtering at different positions on the first sensor element. The spectral filter may be a linear variable filter allowing spectrally dependent filtering at different positions on the first sensor element. It is an advantage of embodiments according to the present invention that a compact system can be obtained.

The substrate on which the first sensor element and the second sensor element are integrated may be a same semiconductor chip. It is an advantage of embodiments according to the present invention that the sensor elements can be made using similar processing steps in a single processing flow avoiding the need for alignment of the sensor elements.

The first sensor element may be adapted for being a hyperspectral sensor. The first sensor element and the second sensor element may have the same number of pixels in at least one direction. The pixels of the first sensor element may be aligned with the pixels of the second sensor element.

The sensing device may be integrated in an imaging system for obtaining multi-spectral image information.

The imaging system may comprise a processor for coupling the geometric referencing information to the multi-spectral information.

The imaging system furthermore may comprise a single optical element for focusing radiation of the region of interest onto each of the sensor elements.

The first sensor may be configured for substantially simultaneously capturing image information of one part of the region of interest using one part of the first sensor and image information of another part of the region of interest using another part of the second sensor, and the second sensor may be configured for capturing image information of both said one part of the region of interest and said another part of the region of interest substantially simultaneously.

The present invention also relates to a method for obtaining image data regarding a region of interest in relative movement with respect to a sensing device, the method comprises obtaining a set of multi spectral data regarding a region of interest using a first two dimensional sensor element by obtaining subsequent multi-spectral images during the relative motion of the region of interest with respect to the sensing device, said obtaining a set of distinct spectral data comprising obtaining spectral information at a first wavelength or wavelength range using a part of the first sensor element and obtaining spectral information at a second wavelength or wavelength range using another part of the first sensor element, and obtaining a two-dimensional image of the region of interest using a second sensor element integrated on the same substrate as the first sensor element, deriving geometric referencing information for the two-dimensional image of the region of interest, and correlating the geometric-referencing information with the multi-spectral data regarding the region of interest to obtain geometric referenced multi-spectral data of the region of interest.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Devices and systems according to various embodiments as well as the making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the claims of the invention.

Where in the present invention reference is made to a two dimensional multi-spectral image, reference is made to an m×n pixilated image comprising information regarding one part of a region of interest imaged at one wavelength or spectral region and comprising information regarding at least another part of a region of interest imaged at a different wavelength or spectral region. Whereas the obtained spectral information within one spectral region may be a line, group or sub-matrix of pixels, the overall underlying pixelated sensor typically is a two dimensional spectral sensor. Embodiments according to the present invention may be applicable in a broad spectral range of electromagnetic radiation. Particular ranges that may be covered are visual and near IR (VNIR), typically considered to be in the range 400 nm to 1000 nm), short wave infrared, thermal infrared, etc, embodiments of the present invention not being limited to the exemplary ranges given.

Where in embodiments of the present invention reference is made to a multi-spectral image or multi-spectral image data, reference is made to data comprising separate information regarding a region of interest for at least two different wavelengths or wavelength regions. Hyperspectral images or image data refer to data comprising separate information for a large number of wavelength or wavelength regions.

Where in embodiments according to the present invention reference is made to geo-referencing or geometric referencing of a point or object in the region of interest, reference is made to the existence of the point or object in a region of interest in physical space. It refers to establishing the location in terms of map projections or coordinate systems. The latter may for example include positional information, e.g. relative positional information. Such positional information may be (x,y) related positional information, but also z-related positional information such as height or relative height. It is not only applicable to aerial photography, aerial imaging or satellite imaging, where it is often referred to as georeferencing, but also in other applications, such as for example in industrial inspection.

In a first aspect, the present invention relates to a sensing device for obtaining geometric referenced multi-spectral image data. The sensing device may especially be suitable for hyperspectral imaging, although embodiments of the present invention are not limited thereto. The sensing device according to embodiments of the present invention are especially suitable for obtaining geometric referenced multi-spectral image data, using a sensing device and a region of interest in relative movement with respect to each other, which is for example the case when imaging from air is performed or when imaging using a top view is performed. The sensing device according to embodiments of the present invention comprises a single substrate, e.g. a single chip. The substrate may be any type of substrate, such as for example a glass substrate, a polymer substrate, a semiconductor substrate, etc. In some advantageous embodiments, the substrate may be a semiconductor chip, providing the possibility of using semiconductor processing steps for integration of the sensor elements.

The single chip comprises at least a first two dimensional sensor element, whereby the sensing device is adapted for providing spectrally different information for different parts of a region of interest using the first two dimensional sensor element. The single chip also comprises a second two dimensional sensor element, whereby the sensing device is adapted for providing geometric referencing information of the region of interest using the second sensor element. The geometric referencing information advantageously may be coupled to the spectral information obtained by the sensing device. It is an advantage of embodiments according to the present invention that at least one first and second sensor element are processed on the same chip. The latter allows for accurate alignment of the sensor elements, such that little or no subsequent alignment for positioning the sensor elements with respect to each other is required.

By way of illustration, the present invention not being limited thereto, an exemplary sensing device as well as an imaging system comprising such a sensing device will be further discussed with reference to FIG. 1 to FIG. 3, embodiments of the present invention not being limited thereto.

Figure 1:
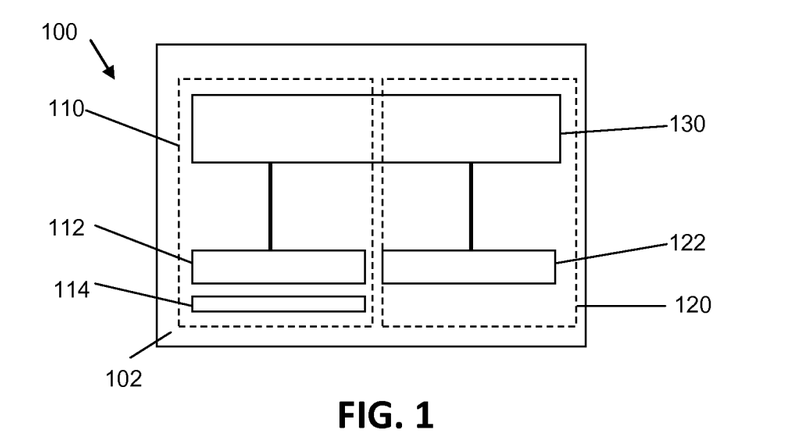
FIG. 1 shows a schematic overview of a sensing device for obtaining geo-referenced multi-spectral data according to an embodiment of the present invention.
Figure 2:
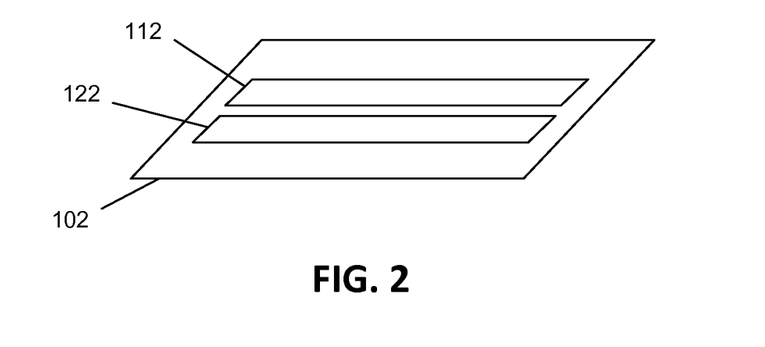
FIG. 2 shows a schematic illustration of the lay-out of sensor elements on the sensing device for obtaining geo-referenced multi-spectral data according to an embodiment of the present invention.

In FIG. 1, a sensing device 100 according to an embodiment of the present invention is shown, wherein the sensing device 100 comprises at least one first sensor element 112 and a second sensor element 122 processed on the same chip, i.e. processed on the same substrate 102. The first sensor element 112 and second sensor element 122 and optional further sensor elements thus may be homogeneously or heterogeneously processed sensor elements, processed on the same substrate 102. Advantageously, the sensor elements are homogeneously processed sensor elements 112, 122 on the same substrate 102. The sensor elements 112, 122 may be integrated on the same substrate 102 whereby the different layers constituting the different sensor elements are processed for both sensor elements 112, 122 using the same processing technology, for example—but not limited to—CMOS processing technology. The sensor elements typically may comprise a plurality of pixels. The pixels typically may be arranged in a matrix form in a number of columns and rows, although the invention is not limited thereto. The sensor elements may be referred to as frame sensor elements, as the sensor elements are two dimensional sensor elements, comprising e.g. a matrix of sensor pixels m×n. The two sensor elements may be selected so that at least one of the number of pixels in a row or the number of pixels in a column is the same for both sensors. In an advantageous embodiment, the sensor elements may comprise a high number of pixels in one direction for imaging simultaneously a relatively wide region of interest. If for example the sensing device is used for detecting or monitoring a region of interest using an UAV, a preferred scanning width may be at least 1000 m, more advantageously at least 2000 m, still more advantageously at least 3000 m. Taking into account a preferred ground resolution of at least 1 m, more advantageously at least 50 cm, still more advantageously at least 30 cm, the number of pixels in one direction may in some examples be at least 1000, in other examples at least 4000, in still other examples 10000. By way of illustration, embodiments of the present invention not being limited thereby, an example of a lay-out for the sensor elements 112, 122 on the substrate is shown in FIG. 2. The sensor elements 112, 122 advantageously are surface aligned. The distance between the two sensors may be smaller than 1 mm, although embodiments of the present invention are not limited thereby.

The sensing device 100 furthermore comprises drive and read-out circuitry for driving the sensor elements 112, 122. The drive and read-out circuitry 130 may be adapted for driving the sensor elements 112, 122 differently from each other. For example, the integration time over which the pixels of the sensor elements 112, 122 are capturing information may be different. The drive and read-out circuitry 130 may be a drive and read-out circuit as known from prior art, whereby the drive and read-out circuitry 130 may comprise components such as amplifiers, switches, a buss, etc. In some embodiments, the pixel design, the column structure and the bus driver are laid out so that a multiplexer following the bus can be avoided, resulting in a better image quality. The drive and read-out circuitry also may be adapted for reading out the sensor elements 112,122. The read-out may be optimized for efficient and fast reading out. For example in a 10000×1200 sensor the frame rate at full resolution may be at least 35 frames per second, e.g. at least 50 frames per second. The driving and reading out also may be performed by different components, i.e. a separate drive circuitry and separate reading-out circuitry may be provided. The sensors may be equipped with shutters so that fast shutting, e.g. electronic shutting, can be obtained. The sensor elements as well as the driving and read-out circuitry may be processed on the same chip or die using semiconductor processing, such as for example CMOS technology, embodiments of the invention not being limited thereto. It is an advantage of embodiments according to the present invention that integration and fabrication on the same chip may result in similar thermal behavior of the at least two sensors, which may be of significant importance as for light weight UAVs, typically no compensation for thermal loads on the systems can be provided in view of weight. A similar thermal behavior of the sensors also may be advantageous in other applications, as no or little thermal load compensation is required.

Whereas embodiments of the present invention have been written making reference to CMOS technology, the invention is not limited thereto. The sensing device may be manufactured using any suitable type of processing, such as for example using semiconductor processing, III-V semiconductor processing, making use of different transistor technology, using MOS technology, etc. In some embodiments according to the present invention, also charge coupled devices CCD's may be used.

According to embodiments of the present invention, the sensing device is adapted for providing different spectral information for different parts of a region of interest using the first two dimensional sensor element. The sensing device may thus be adapted for generating a multi-spectral image. In some embodiments, the sensing device may be adapted for generating hyperspectral data, i.e. in many narrow spectral bands. As the first sensor element according to embodiments of the present invention is a two-dimensional sensor element and as different spectral information is to be captured, typically part of the sensor element may be used for obtaining spectral information at a first wavelength or in a first wavelength region for one part of the region of interest, and at least one other part of the sensor element may be used for obtaining spectral information at least a second wavelength or in at least a second wavelength region for at least another part of the region of interest. In some embodiments, different lines of the sensor element may be used for gathering data at different spectral wavelengths or in different spectral wavelength regions. In other embodiments for example different blocks of the sensor element may be used for sensing different spectral data or different columns may be used for sensing different spectral data. In order to capture different spectral information, a multi-spectral filter 114, advantageously hyper spectral filter, may be present. The multi-spectral filter 114 forms together with the first sensor element 112 and the drive and read-out circuitry or part thereof for controlling the first sensor element 112, the first sensor. The multi-spectral filter may be directly applied to the first sensor element, e.g. mechanically behaving as a single element. Alternatively, the two components may be separate from each other, but configured or arranged so that appropriate filtering is obtained. By way of illustration, some examples of multi-spectral sensors are now discussed.

According to a particular example, the multi-spectral sensor may be adapted for multi-spectral or advantageously hyperspectral imaging using a linear variable filter (LVF). The linear variable filter may for example be a substrate coated with an interference filter with varying, e.g. increasing, thickness along one direction. Applying such a filter in front of the first sensor element, e.g. on the surface of the first sensor element, results in the peak of the transmission curve varying with the thickness. In this way different parts of the sensor may detect different spectral ranges of the electromagnetic spectrum. For avoiding higher order transmissions, e.g. second order transmissions, different sensors with different sensitivity could be used, e.g. a sensor sensitive in the range 400 nm to 700 nm and a sensor sensitive in the range 700 nm and 1000 nm. The linear variable filter may provide a substantially continuously varying change in transmission wavelength. In one example, such a LVF filter may vary through the NIR-visual spectrum. It is an advantage of embodiments according to the present invention that using a linear variable filter may provide a simple multi-spectral sensor which is compact and low in weight. Alternatively, an induced transmittance filter can be used.

In another particular example, the multi-spectral sensor is obtained by providing different spectral filters over different areas of the sensing element so that different spectral sub-images are obtained. The different spectral filters may be coatings applied to different areas of the sensing element. The different spectral filters may be arranged as a step-filter such that one number of lines of the sensing element is covered by a filter filtering one spectral wavelength or one spectral wavelength range, a number of neighbouring lines of the sensing element is covered by a filter filtering at a second wavelength or in a second spectral wavelength range, a further number of neighbouring lines of the sensing element is covered by a filter filtering at a third wavelength or in a third spectral wavelength range, etc.

Figure 3:
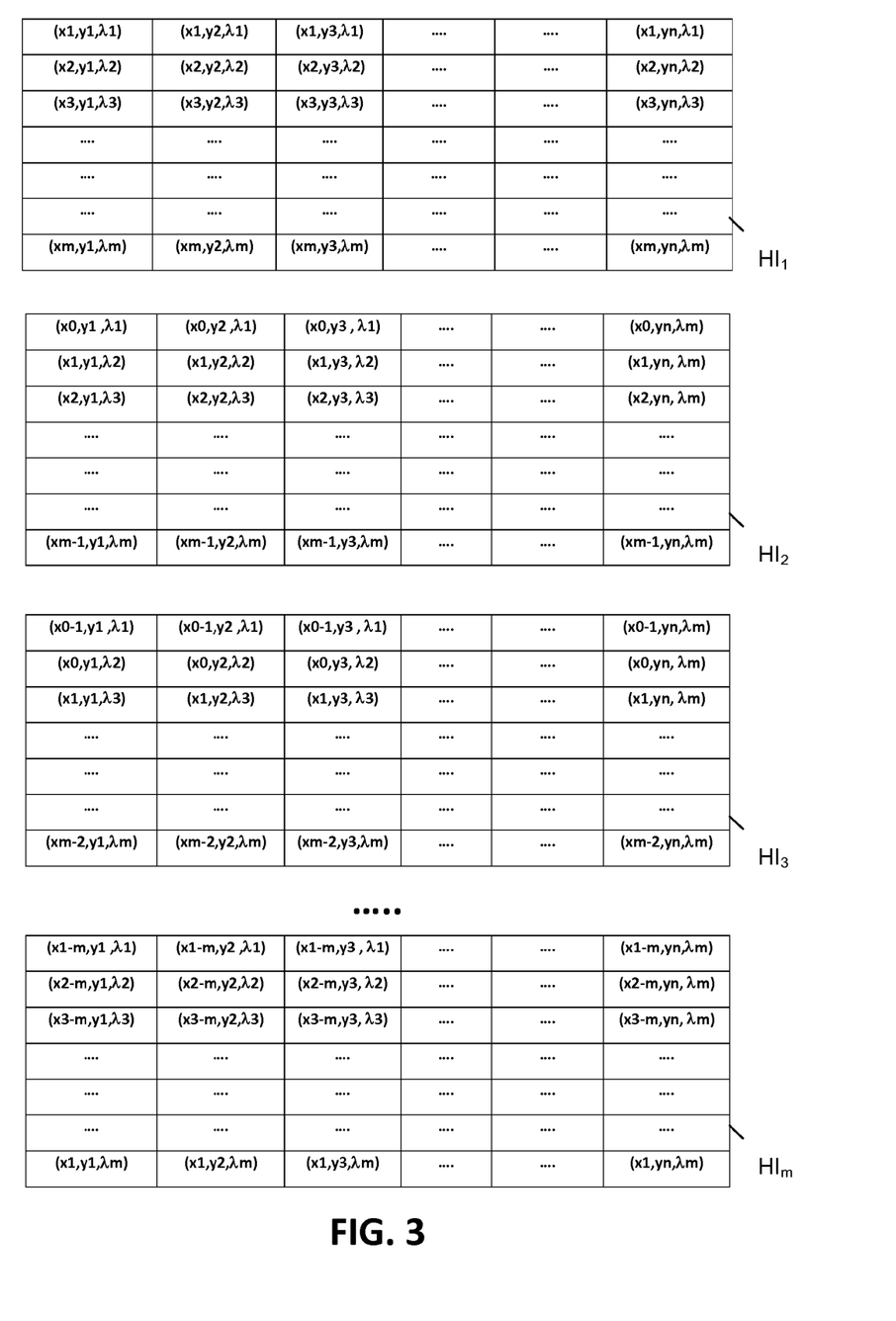
FIG. 3 illustrates a number of hyperspectral images as can be used in a system according to an embodiment of the present invention.

By way of illustration a set of hyperspectral data that can be obtained using a sensor according to an exemplary embodiment of the present invention is shown in FIG. 3. Whereas reference is made to hyperspectral data, the latter also applies to multi-spectral data. FIG. 3 illustrates a plurality of subsequent hyperspectral images recorded in m subsequent time spans, whereby the spectra are recorded for a relative movement between region of interest and sensing or imaging system corresponding with a total shift over a distance xm-x1 traveled during the total of the subsequent time spans.

FIG. 3 illustrates m hyperspectral images, each image consisting of m lines, wherein line $L_j$ comprises information of wavelength $\lambda_j$ or e.g. of spectral band $\lambda_j$-$\lambda_{j-1}$. The different images are recorded within m subsequent time frames. By way of illustration, the imaging of a physical position at coordinates $x_p$ and $y_q$ of the region of interest is indicated throughout the different hyperspectral images. It can for example be seen that in the information regarding the physical position at coordinate x1 for different $y_q$ coordinates of the region of interest is in the first hyperspectral image $HI_1$ found in line 1, in the second hyperspectral image $HI_2$ found in line 2, in the third hyperspectral image $HI_3$ found in line 3, . . . and in the m'th hyperspectral image $HI_m$ found in line m. In each of these hyperspectral images this information is imaged for a different wavelength or wavelength region. Seen in an alternative way, information regarding the region of interest imaged at wavelength $\lambda_m$ or in a corresponding spectral band $\lambda_m$-$\lambda_{m-1}$, can be found by combining the information in line m of subsequent hyperspectral images as adjacent image lines, the ensemble over the m hyperspectral images forming an m×n image of the region of interest imaged at wavelength $\lambda_m$ or in a corresponding spectral band $\lambda_m$-$\lambda_{m-1}$. Similarly, the other lines of m subsequent hyperspectral images contain information regarding a region of interest at a different wavelength or in a different spectral band. The latter illustrates how hyperspectral images provide information regarding different spectral wavelengths or in different spectral bands and how subsequent hyperspectral images recorded during relative movement of region of interest and sensing system can provide an image of the full region of interest for different wavelengths or in different spectral bands. It is to be noticed, that whereas the principle is illustrated for subsequent lines covering different wavelengths, embodiments of the present invention are not limited thereto, and the variety of spectral information also may be obtained in other directions, e.g. varying spectral info for subsequent columns. Furthermore, whereas the principle is illustrated for a sensor wherein each line corresponds with a different wavelength or spectral region, embodiments of the present invention are not limited thereto and several lines of the spectral image may correspond with the same wavelength or spectral region. It is a characteristic of a spectral image that the image comprises information regarding at least two different wavelengths or spectral regions. Capturing of information using the principle as described above has the advantage that using a two dimensional sensor element, two dimensional images are recorded at different wavelengths or spectral regions, i.e. resulting in three dimensional information (two positional dimensions, one spectral dimension). In other words, in some embodiments according to the present invention, the sensor element for spectral data may be used as a set of line or block sensing sub-elements each sub-element recording positional information for a given wavelength or in a spectral region, whereby recording over time during relative movement of the region of interest with respect to the sensor element corresponds with scanning different positions of a region of interest.

As described above, the sensing device 100 furthermore comprises a second two-dimensional sensor element 122 that forms, together with the driving and read-out circuitry or part thereof for driving the second two-dimensional sensor element 122 the second sensor 120. The second sensor 120 may be adapted for obtaining an image of the region of interest from which geo-referencing information can be obtained. The second sensor 120 may be adapted for providing a high resolution image, e.g. in grey scale, providing detailed geometric information, e.g. geographical information, regarding the region of interest. Images obtained via the second sensor 120 may allow to derive tiepoints in the imaged region of interest. The frequency at which the images are captured with the second sensor may be such that an overlap of the image, e.g. with at least 10%, more advantageously with at least 25%, still more advantageously with at least 50% such as e.g. with 60% overlap with the previous image is established, such that information regarding the relative change in orientation of the instrument between subsequent images can be detected. The obtained information regarding rotation may be used as geometric referencing information, according to embodiments of the present invention, for coupling to the multi-spectral data obtained using the first sensor 110, so that geo-referenced multi-spectral data can be obtained.

Figure 4:
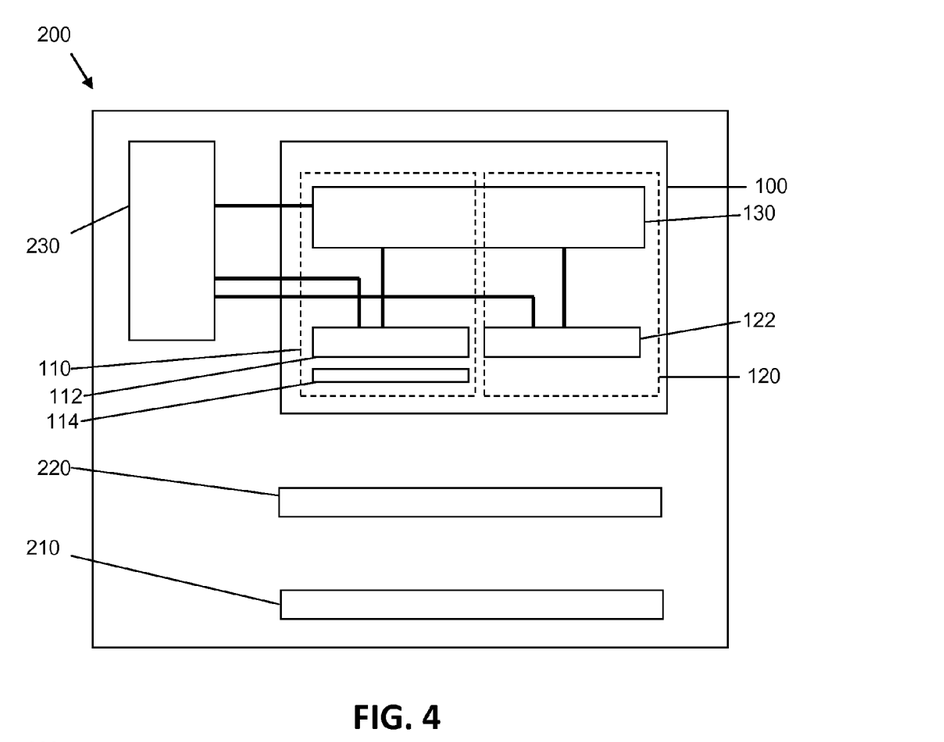
FIG. 4 shows an imaging system comprising a sensing device for obtaining geo-reference multi-spectral image data according to an embodiment of the present invention.

Embodiments of the present invention also relate to an imaging system. A schematic representation of an imaging system 200 comprising a sensing system according to embodiments of the present invention is shown in FIG. 4 by way of example. The imaging system 200 comprises a sensing device 100 as described for example above. The imaging system 200 furthermore comprises optical elements for guiding radiation to the two sensing elements of the sensing device 100. Such optical elements may for example comprise at least one lens 210 for capturing the radiation to be collected and focusing the radiation onto the sensor elements. In some embodiments, a single lens 210 may be used for collecting the radiation for both sensor elements, whereas in other embodiments different lenses may be used for the different sensor elements. In some embodiments according to the present invention, the collected radiation may be split to the two sensor elements using a radiation splitter, such as for example a beam splitter 220. Alternatively, or in addition thereto, the configuration of the sensor elements 112, 122 processed on the same substrate 102 may allow for taking into account positional information between the sensor elements when correlating the images obtained using the two sensor elements.

Figure 6:
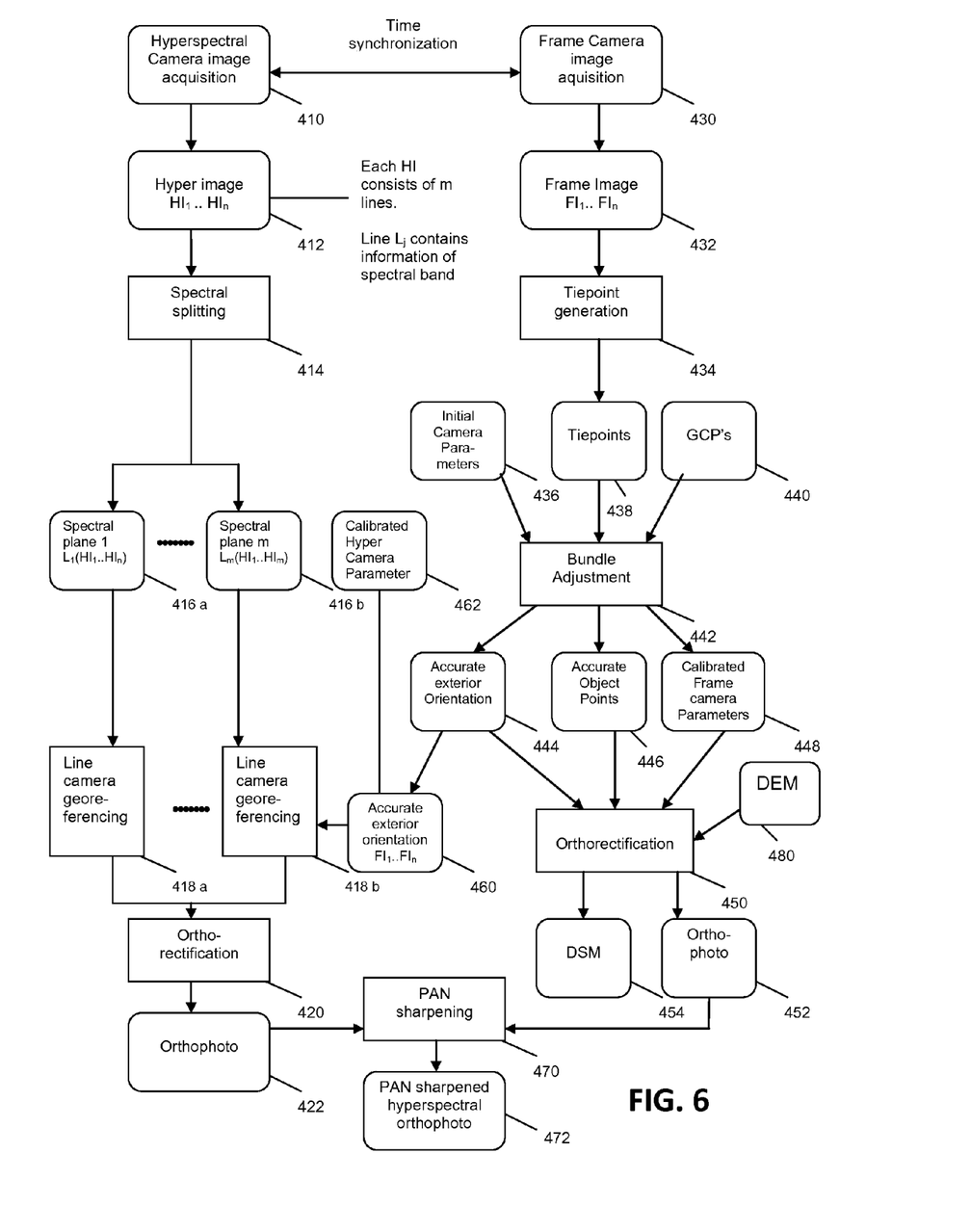
FIG. 6 illustrates a flow chart of a detailed exemplary method according to an embodiment of the present invention.

The imaging system furthermore may comprise an image processor 230 for correlating the images obtained with the first sensor 110 and the second sensor 120. The image processor may for example correlate geometric information, e.g. positional information, obtained with the second sensor 120 with spectral information obtained in different spectral channels in the first sensor 110, so that accurate hyperspectral information is obtained. Such image processing may be performed in a single processor or in a plurality of processors. The processing may be performed after the full set of images have been captured, although in some embodiments substantially direct processing may be performed, as soon as all information regarding the same region of interest is captured in both sensors 110, 120. A more detailed description of the image processing that may be performed by a processor 230 according to embodiments of the present invention will further be discussed later with reference to FIG. 6, illustrating standard and optional steps of an example of a method for sensing according to an embodiment of the present invention.

The imaging device furthermore may comprise a global positioning system for providing GPS data and/or an inertial measurement unit for providing inertial data regarding the imaging system. Such components may assist in providing approximate geo-referencing data, which may assist in deriving geo-referenced spectral-data based on the image obtained with the second sensor 120.

In one aspect, the present invention thus also relates to an imaging system as described above comprising a sensing device as described above. In another aspect the present invention also relates to an industrial system or unmanned aerial vehicle (UAV) comprising such an imaging system for monitoring, imaging or inspection. It thereby is an advantage of embodiments according to the present invention that the sensing device comprises the two sensing elements on the same sensor, such that thermal load due to temperature variation or such that environmental conditions have less influence on the obtained result.

In still another aspect, the present invention relates to a method for obtaining image data regarding a region of interest. It thereby is an advantage of embodiments according to the present invention that multi-spectral data of a region of interest can be obtained with high geometric accuracy, e.g. geographic accuracy, e.g. a geometric accuracy that is significantly higher than can be obtained using global positioning and/or inertial measurement systems alone. The method is especially suitable in applications where multi-spectral data of a region of interest are obtained using sensing device that undergo a relative movement with respect to the region of interest, such as for example in case aerial imaging is performed or e.g. during industrial inspection of moving products. In case of aerial imaging, the method furthermore also is especially suitable for use in unmanned aerial vehicles (UAV), as the method can be performed using components low in weight, which is a major requirement if unmanned aerial vehicles are to be used or are to be used for a longer time. More particularly, the lower the weight to be carried, the lower the power consumption required and the longer flying times can be obtained with the unmanned aerial vehicles.

Figure 5:
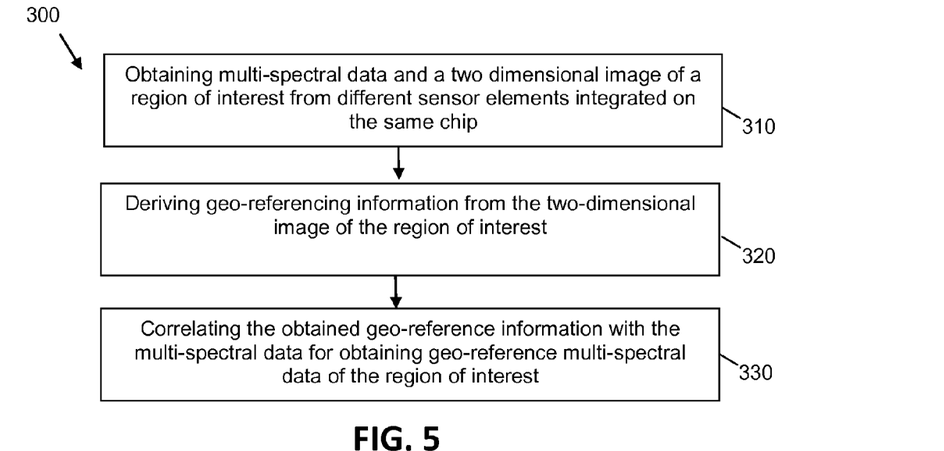
FIG. 5 illustrates a flow chart of an exemplary method according to an embodiment of the present invention.

With reference to FIG. 5 indicating a flow chart of a method embodiment according to the present invention, the method 300 for obtaining image data comprises in a first step 310 obtaining a set of multi spectral data, advantageously hyper-spectral data, regarding a region of interest using a first sensor element and obtaining a two-dimensional image of the region of interest using a second sensor element. Obtaining such data thereby may comprise acquiring the data using sensors, e.g. as described in a system above. Alternatively, obtaining data also may comprise receiving data via an input port in a processing system, whereby the data may have been e.g. previously recorded. Obtaining data thereby is obtaining data from a first and second sensor element, both sensor elements being integrated on the same chip, thus being positioned on the same substrate. The obtained information thus may be correlated through the sensor elements configuration as integrated in the same chip. In a subsequent step 320, geometric referencing information, may be derived from the two-dimensional image of the region of interest, as obtained in the first step 310. Advantageously, the two-dimensional image of the region of interest obtained can be an accurate high resolution image. The latter can for example be an non-colour image which may be captured quickly, such that it suffers little from relative movement between the sensing system and the region of interest to be imaged. The method furthermore comprises the step 330 of correlating the obtained geometric referencing information, with the multispectral data regarding the region of interest, to thus obtain geometric referenced multi-spectral data, of the region of interest. Correlating also may take into account global positioning system information and inertial measurement unit information.

In order to further illustrate standard and optional features of a method according to an embodiment of the present invention, FIG. 6 illustrates a detailed flow chart of an exemplary method for obtaining image data. The exemplary method thereby is adapted for capturing at least one two-dimensional image of the region of interest for deriving geometric referencing information, and for capturing hyper-spectral images using a system as described above. More particularly, in the present example, the different hyperspectral images are obtained during relative movement of the region of interest with respect to the imaging system.

Using one sensor, image acquisition for obtaining a two dimensional image of a region of interest is performed in step 430. Such image acquisition includes acquisition of at least one image but may result in acquisition of a set of frame images $FI_1$, $FI_2$, ... $FI_n$, whereby n images are captured, as indicated in step 432. The images advantageously have a significant overlap so that geometric information, e.g. geographic information, on one image can be transferred to a subsequently or previously captured image and so that relative orientation changes can be detected. The overlap typically may be selected in the order of 60%, although embodiments of the present invention are not limited thereto. From the overlap of at least two images, tiepoints can be generated, as indicated in step 434. Such tie points are points occurring in the overlap of the images and thus allowing a to determine a change in orientation of the instrument between acquisition of subsequent images. Furthermore, some ground control points may be available, providing geographical information indicating a geographical correlation between objects in the region of interest and their image in the two dimensional image, e.g. via GPS, via a list of previously recorded images, etc. The method may comprise a calibration step, wherein bundle adjustment is performed as indicated in 442, based on the generated tiepoints, indicated in 438, on global positioning coordinates, indicated in 440 and on initial camera parameters 436. This post processing step allows to obtain a more accurate exterior orientation, as indicated in 444, and which then can be used for obtaining corrected frame images having an accurate exterior orientation, as indicated in step 460. Optionally also accurate object points and frame camera parameters can be used. Accurate object points and accurate calibration frame camera parameters as well as standard Digital Elevation Model (DEM) products can be obtained as indicated in steps 446, 448, 480.

On the other hand, using another sensor, spectral camera image acquisition, e.g. hyper-spectral camera image acquisition is performed in step 410, resulting in a set of spectral images as indicated in step 412, whereby, in the present example each spectral image consists of a plurality of lines and each line contains information of a particular spectral band. As set out with reference to FIG. 3, the full spectral information regarding a region of interest for a given wavelength or in a given wavelength region is distributed over different, typically subsequently imaged, hyper-spectral images and using spectral splitting as indicated by 414, spectral plane information is obtained for the full region of interest as indicated in steps 416*a*, 416*b*. Using the geometric-referencing information obtained in step 460, geometric-referenced multi-spectral information can be obtained by coupling the geometric-referencing information including e.g. orientational information, to the spectral plane data, optionally including calibrated hyper spectral camera parameters as indicated in 462. The latter results in geometric-referenced spectral information, as shown in 418*a*, 418*b*.

Using the obtained data, an orthorectification of the images may be performed as indicated in steps 420 and 450 for the multi-spectral and conventional 2-dimensional image respectively, resulting in an orthophoto for both the multi-spectral and conventional 2-dimensional image, as indicated in steps 422 and 452 respectively. Orthorectification means terrain corrected geometric referencing of imagery using for example the sensor exterior orientation parameters, frame camera parameters (also referred to as interior orientation) and standard Digital Elevation Model (DEM) products. The result of this operation is an orthophoto. Combining these orthophoto images allows performing PAN sharpening of the multi-spectral data, as indicated in step 470, such that a PAN sharpened hyperspectral orthophoto can be obtained, as indicated in step 472. The orthorectification of the conventional 2-dimensional image may give rise to an digital surface model, as indicated in step 454.

The above schematic overview illustrates some standard and optional features and advantages according to embodiments of the present invention.

Where the examples of embodiments of the present invention mainly refer to geometric referencing for aerial photography, aerial imaging or satellite imaging, as indicated above, embodiments of the present invention are not limited thereto and may for example also be used for industrial inspection etc. In one example a sensing device can for example be used for inspecting goods on a conveyor belt, e.g. for detecting foreign materials between goods or for detecting deviating goods. Such foreign materials or deviating goods typically will show a spectral image deviating from the expected spectral image. The geometric referencing information may be a lateral position of objects or materials but also may be a height or relative height. Such a height or relative height of objects may for example be determined from the geometric referencing information based on the viewing angle of the geometric referencing sensor with respect to the object imaged. Deriving height information from image data based on a known sensor position and viewing angle with respect to the overall region of interest to be imaged is known by persons skilled in the art.

Figure 7:
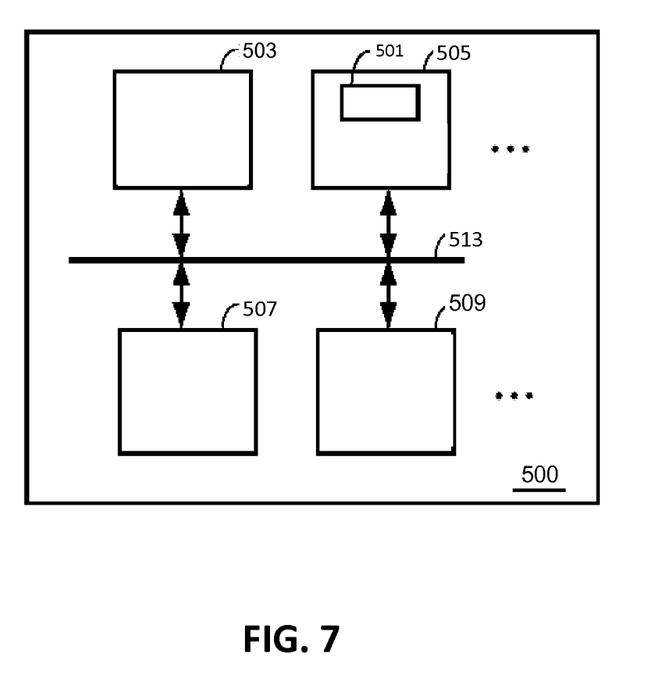
FIG. 7 illustrates an example of a processor that may be used for performing a method or part thereof according to an embodiment of the present invention.

In one aspect, the present invention also relates to a processing system wherein the method for sensing or imaging or part of such method as described in embodiments of the previous aspects are implemented in a software based manner. FIG. 7 shows one configuration of a processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Thus, one or more aspects of embodiments of the present invention can be implemented in digital electronic circuitry, or in computer hardware, firmware, software, or in combinations of them. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 7. The various elements of the processing system 500 may be coupled in various ways, including via a bus subsystem 513 shown in FIG. 7 for simplicity as a single bus, but will be understood to those in the art to include a system of at least one bus. The memory of the memory subsystem 505 may at some time hold part or all (in either case shown as 511) of a set of instructions that when executed on the processing system 500 implement the steps of the method embodiments described herein. Thus, while a processing system 500 such as shown in FIG. 7 is prior art, a system that includes the instructions to implement aspects of the methods for sensing or imaging is not prior art, and therefore FIG. 7 is not labeled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention. The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A sensing device for obtaining geometric referenced multi-spectral image data of a region of interest in relative movement with respect to the sensing device, the sensing device comprising:
at least a first two dimensional sensor element, and a spectral filter,
the sensing device being arranged to obtain subsequent multi-spectral images during said relative motion of the region of interest with respect to the sensing device, thus providing distinct spectral information for different parts of a region of interest using the first sensor element,
the spectral filter and the first sensor element being arranged to obtain spectral information at a first wavelength or wavelength range using a part of the first sensor element and to obtain spectral information at a second wavelength or wavelength range using another part of the first sensor element, a second two dimensional sensor element, the sensing device being arranged to provide, using the second sensor element, an image of the region of interest for generating geometric referencing information to be coupled to the distinct spectral information, the second sensor element being adapted to provide a high-resolution image, providing detailed geometric information of the region of interest, and the first two dimensional sensor element and second two dimensional sensor element being integrated on the same substrate.

2. The sensing device according to claim 1, wherein the spectral filter is provided on the first sensor element to obtain distinct spectral information on at least two different lines or columns or blocks of the first sensor element.

3. The sensing device according to claim 2, wherein the spectral filter is a step-filer comprising a plurality of spectral bands allowing spectrally dependent filtering at different positions on the first sensor element.

4. The sensing device according to claim 2, wherein the spectral filter is a linear variable filter allowing spectrally dependent filtering at different positions on the first sensor element.

5. The sensing device according to claim 1, wherein the substrate is a semiconductor chip.

6. The sensing device according to claim 1, wherein the first sensor element is configured as a hyperspectral sensor.

7. The sensing device according to claim 1, wherein pixels of the first sensor element are aligned with pixels of the second sensor element.

8. The sensing device according to claim 1, integrated with an imaging system so that multi-spectral image information is obtainable.

9. The sensing device according to claim 8, wherein the imaging system comprises a processor coupling the geometric referencing information with the multi-spectral information.

10. A sensing device according to claim 1, wherein the imaging system comprises a single optical element that focuses radiation of the region of interest onto each of the sensor elements.

11. The sensing device according to claim 1, wherein the first sensor is configured to substantially simultaneously capture image information of one part of the region of interest using one part of the first sensor and image information of another part of the region of interest using another part of the second sensor, and wherein the second sensor is configured to capture image information of both said one part of the region of interest and said another part of the region of interest substantially simultaneously.

12. A method for obtaining image data regarding a region of interest in relative movement with respect to a sensing device, the method comprising:

obtaining a set of distinct spectral data regarding a region of interest using a first two dimensional sensor element by obtaining subsequent multi-spectral images during the relative motion of the region of interest with respect to the sensing device, said obtaining a set of distinct spectral data comprising obtaining spectral information at a first wavelength or wavelength range using a part of the first sensor element and obtaining spectral information at a second wavelength or wavelength range using another part of the first sensor element, obtaining a two-dimensional image of the region of interest using a second two dimensional sensor element integrated on the same substrate as the first two dimensional sensor element, wherein the second sensor element is adapted to provide a high-resolution image, providing detailed geometric information of the region of interest, deriving geometric referencing information for the two-dimensional image of the region of interest, and correlating the geometric referencing information with the distinct spectral data regarding the region of interest to obtain geometric referenced multi-spectral data of the region of interest.

13. A sensing device for obtaining geometric referenced multi-spectral image data of a region of interest in relative movement with respect to the sensing device, the sensing device comprising:

at least a first two dimensional sensor element, and a spectral filter, the sensing device being arranged to obtain subsequent multi-spectral images during said relative motion of the region of interest with respect to the sensing device, thus providing distinct spectral information for different parts of a region of interest using the first sensor element, the spectral filter and the first sensor element being arranged to obtain spectral information at a first wavelength or wavelength range using a part of the first sensor element and to obtain spectral information at a second wavelength or wavelength range using another part of the first sensor element, a second two dimensional sensor element, the sensing device being arranged to provide, using the second sensor element, an image of the region of interest for generating geometric referencing information to be coupled to the distinct spectral information, the second sensor element being adapted to provide a high-resolution image, providing detailed geometric information of the region of interest, and the first two dimensional sensor element and second two dimensional sensor element being integrated on the same substrate, wherein the sensing device is further configured in a way such that two-dimensional images are recorded at different wavelengths.

14. The sensing device according to claim 1, wherein at least one number of pixels in a row or column are the same for the first two dimensional sensor element and the second two dimensional sensor element.

* * * * *